(12) United States Patent
Fleck et al.

(10) Patent No.: US 9,862,110 B2
(45) Date of Patent: Jan. 9, 2018

(54) ROD COATING STRIPPER

(71) Applicant: Lifting Solutions Inc., Edmonton (CA)

(72) Inventors: Shane Fleck, St. Albert (CA); Chad Giesbrecht, Edmonton (CA); Shawn Hansen, Three Hills (CA)

(73) Assignee: LIFTING SOLUTIONS, INC., Edmonton (CA)

( * ) Notice: Subject to any disclaimer, the term of this patent is extended or adjusted under 35 U.S.C. 154(b) by 0 days.

(21) Appl. No.: 15/169,968

(22) Filed: Jun. 1, 2016

(65) Prior Publication Data

US 2016/0354942 A1    Dec. 8, 2016

Related U.S. Application Data

(60) Provisional application No. 62/170,948, filed on Jun. 4, 2015.

(51) Int. Cl.

| | |
|---|---|
| *B26D 3/28* | (2006.01) |
| *B26D 3/16* | (2006.01) |
| *B26D 1/02* | (2006.01) |
| *H01B 15/00* | (2006.01) |
| *E21B 17/10* | (2006.01) |
| *B26D 3/00* | (2006.01) |

(52) U.S. Cl.
CPC .............. *B26D 3/28* (2013.01); *B26D 1/02* (2013.01); *B26D 3/16* (2013.01); *E21B 17/1071* (2013.01); *H01B 15/006* (2013.01); *B26D 3/001* (2013.01); *Y02W 30/821* (2015.05); *Y10T 83/6584* (2015.04); *Y10T 83/6648* (2015.04); *Y10T 156/1184* (2015.01); *Y10T 156/1967* (2015.01)

(58) Field of Classification Search
CPC ........ B26D 1/02; B26D 3/001; H01B 15/006; Y02W 30/821; Y10T 83/6584; Y10T 83/6635; Y10T 156/1184; Y10T 156/1967
See application file for complete search history.

(56) References Cited

U.S. PATENT DOCUMENTS

| | | | |
|---|---|---|---|
| 2,099,084 A | 11/1937 | Seckham | |
| 2,346,227 A | 4/1944 | Martin et al. | |
| 2,370,051 A | 2/1945 | Leape | |
| 2,429,611 A * | 10/1947 | Churnell | H01B 7/36 81/9.51 |
| 2,434,640 A * | 1/1948 | Burdwood | H01B 7/36 81/9.51 |
| 2,485,518 A | 10/1949 | Vermette | |

(Continued)

FOREIGN PATENT DOCUMENTS

| | | | |
|---|---|---|---|
| CA | 2512540 | 7/2012 | |
| DE | EP 0682273 A1 * | 11/1995 | B62D 3/001 |

(Continued)

*Primary Examiner* — Mark A Osele
(74) *Attorney, Agent, or Firm* — Dentons US LLP; Brian R. McGinley

(57) ABSTRACT

A stripper for stripping coating off of coated sucker rod is provided. The stripper can have a frame having spaced-apart and opposing end plates with a passageway for receiving the coated rod. Rollers located in the frame guide the coated rod as it passes through the passageway. A cutting bar contacts the coated rod to cut a strip off of the coated rod, leaving a remainder of coating that can be deflected off of the coated rod by a deflector as the coated rod passes through the stripper.

13 Claims, 10 Drawing Sheets

(56) References Cited

U.S. PATENT DOCUMENTS

| | | | | |
|---|---|---|---|---|
| 3,316,781 | A * | 5/1967 | Bignell | H01B 7/36 |
| | | | | 81/9.51 |
| 3,977,277 | A * | 8/1976 | Baston | B23D 23/02 |
| | | | | 81/9.51 |
| 4,534,254 | A * | 8/1985 | Budzich | H01B 15/005 |
| | | | | 29/403.3 |
| 5,107,735 | A * | 4/1992 | Ramun | H01B 15/006 |
| | | | | 81/9.51 |
| 5,165,700 | A | 11/1992 | Stoll et al. | |
| 5,199,226 | A * | 4/1993 | Rose | B24C 1/086 |
| | | | | 118/305 |
| 5,306,378 | A * | 4/1994 | Takimoto | G02B 6/245 |
| | | | | 156/717 |
| 5,460,071 | A * | 10/1995 | Barrett | B09B 5/00 |
| | | | | 30/92.5 |
| 5,603,509 | A | 2/1997 | Stoll et al. | |
| 6,088,900 | A * | 7/2000 | Finzel | G02B 6/4497 |
| | | | | 29/403.4 |
| 6,694,853 | B2 | 2/2004 | Adams | |
| 9,272,502 | B2 * | 3/2016 | Flood | B29C 63/0013 |
| 2009/0084237 | A1 | 4/2009 | Adams | |
| 2015/0270034 | A1 * | 9/2015 | Wabnegger | H01B 15/006 |
| | | | | 241/25 |

FOREIGN PATENT DOCUMENTS

| | | |
|---|---|---|
| EP | 0 964 190 | 12/1999 |
| KR | 810000222 | 3/1981 |

\* cited by examiner

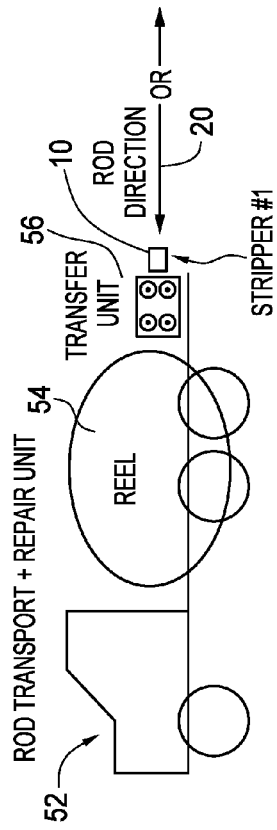
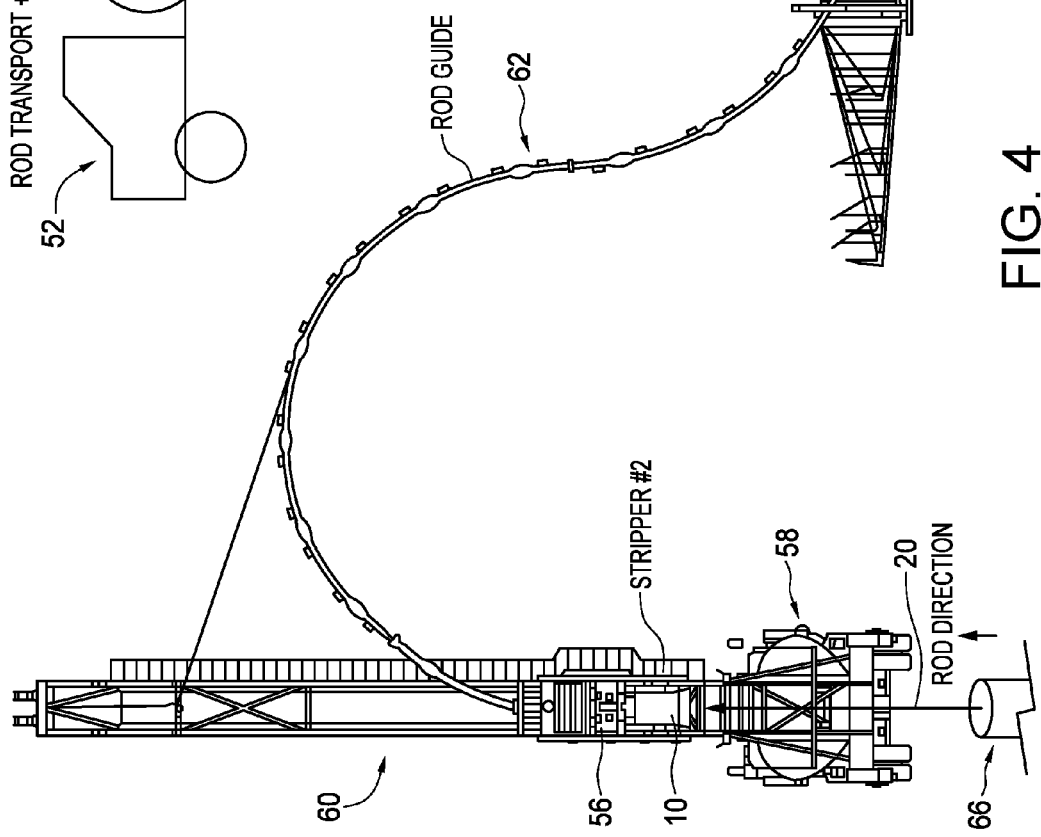

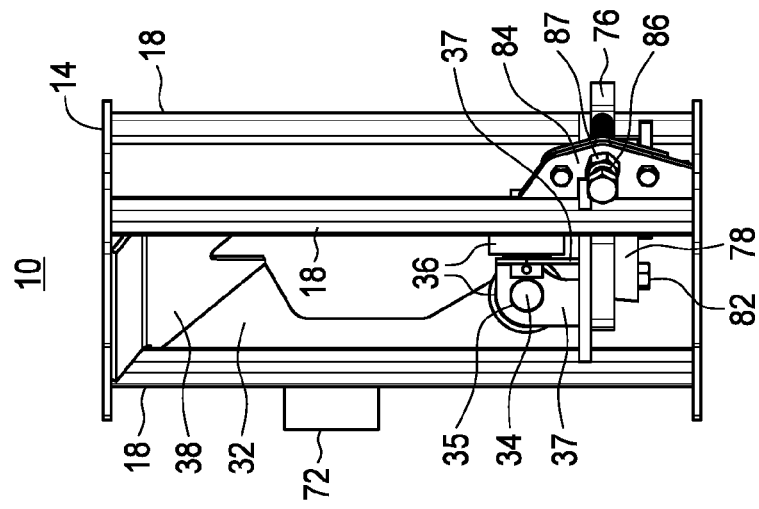
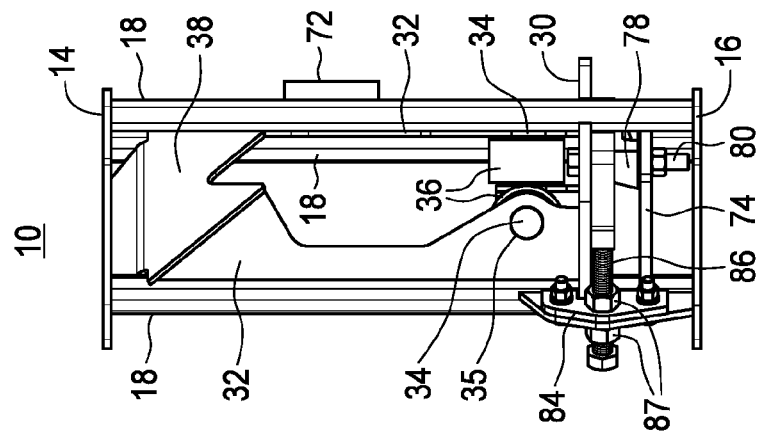
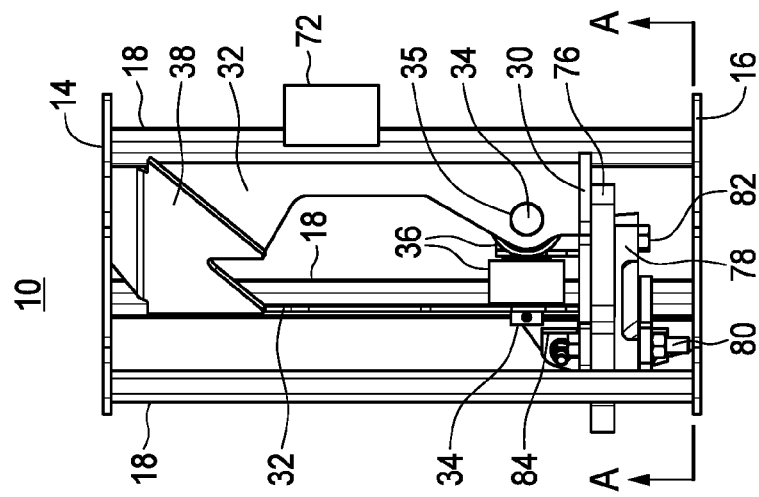

ROD COATING STRIPPER

CROSS-REFERENCE TO RELATED APPLICATIONS

This application claims priority of U.S. provisional patent application Ser. No. 62/170,948 filed Jun. 4, 2015, which is incorporated by reference into this application in its entirety.

TECHNICAL FIELD

The present disclosure is related to the field of stripping devices, in particular, rod coating strippers for use in stripping off coatings from coated sucker rods used in conjunction with pump jacks and progressive cavity pumps on producing oil wells.

BACKGROUND

In common methods for producing oil from a well drilled into an oil-bearing subsurface formation, a string of steel production tubing is positioned in the wellbore and extends from the subsurface production zone up to a pump jack at surface in accordance with well-known methods. A downhole pump is disposed within the production tubing in the production zone to raise well fluids (e.g., oil, gas, formation water) to the surface, by reciprocating vertical movement of a travelling valve incorporated into the pump. The travelling valve is reciprocated by a typically steel "sucker rod" string extending upward within the production tubing to the well where it connects to a polished rod extending upward through a wellhead tee and stuffing box to connect to the "horse head" at the free end of the "walking beam" of the pump jack. By means of a suitable motor and associated mechanical linkage, the pump jack is operable to rock the walking beam such that the horse head reciprocates up and down, thereby alternately raising and lowering the sucker rod and the travelling valve, causing well fluids to be drawn into the well and the production tubing, and to be moved upward within the production tubing toward the wellhead, on each upward stroke of the travelling valve.

As the sucker rod reciprocates within the production tubing, it inevitably comes into contact with the inner wall of the tubing. The resultant friction between the steel sucker rod and the tubing causes wear on both the rod and the tubing. Such wear is a particular problem in "deviated" wells, in which the rod string will unavoidably rub against curved portions of tubing transitioning between vertical and horizontal (or slanted) sections of such wells. In addition to causing wear, the friction between the sucker rod and the tubing increases the magnitude of the force that needs to be provided by the pump jack to raise the sucker rod (and the travelling valve) on each upward stroke.

As an alternative to a pump jack as described above, well fluids may also be produced using a wellhead apparatus that rotates a sucker rod string to drive a downhole screw pump (also known as a positive displacement pump), rather than reciprocating the sucker rod string up and down. Although rotating sucker rods thus function in a different fashion than reciprocating sucker rods, they are nonetheless prone to friction-induced wear due to contact with the tubing.

Sucker rods are typically round or semi-elliptical in cross-section, and typically hot-rolled from carbon or alloy steel, with diameters ranging from ⅝ to 1-¼ inches. Sucker rod strings are commonly made up as a string of individual sucker rods (typically 25 feet in length) threaded together using internally-threaded tubular couplers. The ends of a threaded sucker rod are typically upset (i.e., larger in diameter than the main length of the rod), and are threaded for mating engagement with couplers. The upset portion at each end of a threaded sucker rod is typically about 5 inches long, and includes a tool-engagement section (e.g., wrench flats) to facilitate use of a wrench to tighten a coupler onto the rod. The threaded upset ends of a sucker rod are commonly referred to as pin ends.

It is also known to use a continuous (or so-called "endless") sucker rod instead of a sucker rod string as described above. A continuous sucker rod has only two pin ends; i.e., a lower pin end for connection to the travelling valve of a downhole pump, and an upper pin end for connection to the polished rod. Continuous rod may be several thousand feet in length, depending on the depth to the production zone. It is known to mitigate the undesirable consequences of friction between sucker rods and production tubing by coating the sucker rods and/or lining the tubing with a low-friction material such as HDPE (high-density polyethylene). Such coatings also provide protection against corrosion in addition to protecting against friction-induced wear. Other polymeric coating materials that may be used for coating sucker rods can comprise polyethylene terephthalate ("PET"), polypropylene, polystyrene, epoxy, and acetyl, ethylene ("ETFE"), polytetrafluoroethylene (PTFE, or "Teflon"®), polyphenylensulfide (PPS, or "Fortron"®), polyamide (nylon), polyester, polyethersulfone, polyethylene include but are not limited to polyvinylidene fluoride (PVDF), ethylene tetrafluoroethylene (ETFE), polytetrafluoroethylene ("PTFE", or "Teflon"®), polyphenylensulfide ("PPS", or "Fortron"®), polyamide (nylon), polyester, polyethersulfone, polyethylene terephthalate ("PET"), polypropylene, polystyrene, epoxy and acetyl.

International Publication No. WO 2012/109736 (Moore et al.) teaches one process for coating continuous sucker rods with HDPE or other plastic or polymeric materials. Coated continuous rods have been found to have considerably longer service lives than uncoated rods in comparable operating conditions. For example, in approximately 250 producing wells in Alberta (Canada) refitted to date with continuous sucker rod coated in accordance with WO 2012/109736, rod service life (i.e., operational time before the rod replacement is required due to wear and/or corrosion) has been found to increase from an average of two months (for uncoated continuous rod) to as much as six months or more, thus greatly reducing downtime and associated costs. In addition, virtually no breaks due to wear and corrosion have occurred in the main portions of the continuous rods (i.e., away from the portions of the rod near the upset pin ends).

It is not uncommon for sucker rods to fracture due to fatigue after being in service in a producing well for a period of time. These fractures typically occur within one foot (305 mm) or so of upset pin ends of the rod. When a fracture occurs in one section of rod in a jointed sucker rod string, repair is commonly done by extracting the portion of the rod string above the fracture point, using an appropriate fishing tool to lift the section of the rod string below the fracture (along with the attached travelling valve of the downhole pump) as necessary to fully expose the lower portion of the broken rod section, uncoupling both portions of the broken rod section, and then coupling a replacement section into the rod string. The repaired rod string can then be lowered back into the tubing, and production from the well can resume.

In the case of wells using continuous sucker rods, it has been observed that rod fractures occur much more often near the lower pin end than near the upper pin end. When a continuous sucker rod fractures near its lower pin end, the length of rod above the fracture must be extracted from the well for repair, and the lower pin end (with attached travelling valve) must also be extracted from the tubing. To repair the rod, it is cut off at an undamaged point away from the fractured end, and a new pin end is welded to the rod. When the continuous rod is a coated rod, however, the coating needs to be repaired as well. It is highly desirable for the coating repair to restore the integrity of the coating as fully as reasonably possible, particularly in cases where the lower pin end is being replaced. Given that fractures in continuous rods occur most often near their lower pin ends, effective restoration of the integrity of the coating of a coated continuous rod after repair of a rod fracture is an important consideration to protect the replacement pin end and the repair weld zone against corrosion and wear, and thereby to maximize the service life of the repaired coated rod. To do this, however, first requires removing the old coating from the rod before repairing the rod and placing a new coating thereon.

It is, therefore, desirable to provide a rod coating stripper that provides an easy and safe way to remove the coating from the rod.

SUMMARY

A stripping apparatus, or stripper, for stripping coating off of coated rod is provided. In some embodiments, the stripper can comprise a frame having spaced-apart and opposing end plates further comprising a passageway extending therethrough, the passageway configured for receiving the coated rod. There can be guiding rollers disposed in the frame to guide the coated rod as it passes through the stripper. In addition, a cutting bar can be disposed in the frame configured such that the cutting bar contacts the coated rod to cut a strip of coating off of the coated rod thereby leaving a remainder of the coating on the rod, and such that the coated rod contacts the guiding rollers to keep the coated rod positioned within the passageway as the coated rod passes through the stripper.

In some embodiments, the stripper can comprise a deflector disposed in the frame and configured to remove the remainder of the coating off of the rod as it passes through the stripper. In some embodiments, the deflector can comprise a groove configured such that the coated rod is positioned within the groove thereby enabling the deflector to contact the remainder of the coating at at least two points and remove, or deflect, the remainder of the coating off of the coated rod. When a coated rod is placed in the passageway of the stripper, the cutter bar can be adjusted towards the coated rod contacts the guide rollers and remain in fixed position within the passageway. The cutter bar can then be further adjusted towards the coated bar such that it can cut away a strip of coating off of the coated rod as it passes through the passageway thereby leaving a remainder of the coating on the coated rod. Furthermore, the deflector can peel away or remove the remainder of the coating from the rod as it passes through the passageway. For the purposes of this description, the term of phrase "passes through the passageway" is defined as the moving of one or both of the coated rod and the stripper relative to one another; it is not limited to the moving of the coated rod through a stationary stripper, it can additionally include the moving the stripper along the coated rod, which can be kept stationary.

In operation, the stripper can be configured to attach to a rod transfer unit, as well known by those skilled in the art, such that the rod transfer unit can pull coated rod through the stripper thereby stripping the coating off of the coated rod before it passes through the rod transfer unit. For the purposes of this description the claims herein, the term "rod transfer unit" is defined as including continuous rod grippers and continuous rod injectors, as well known to those skilled in the art. A representative example of such a rod transfer unit is an X-celerator® Coiled Rod Injector model 250 as manufactured and sold by Automated Rig Technologies Inc. of Calgary, Alberta, Canada. In some embodiments, the stripper can be attached to a rod transfer unit installed on a mobile rod transport and repair unit or truck wherein coating can be stripped off of coated rod before it is wound onto a rod reel disposed on the truck. In some embodiments, the stripper can be attached to a rod transfer unit disposed on a mobile well service rig or truck wherein coating can be stripped off of coated rod as it is pulled out of a well. In some embodiments, the stripper can be attached to a rod transfer unit disposed on the end of a rod guide wherein coating can be stripped off of coated rod as it is unwound off of a horizontal rod storage reel.

Broadly stated, in some embodiments, an apparatus can be provided for stripping coating off of a coated rod, the apparatus comprising: a frame configured for attachment to a rod transfer unit, the frame further comprising a passageway extending therethrough for receiving the coated rod, the passageway defining a longitudinal axis through the frame; at least one first roller disposed in the frame configured for contacting and guiding the coated rod in the apparatus when the coated rod passes through the passageway, the at least one first one roller configured to rotate about a first axis that is substantially orthogonal to the longitudinal axis; and a cutter configured for cutting a strip of coating off of the coated rod when passing through the passageway.

Broadly stated, in some embodiments, the frame can comprise a first support member, a second support member and at least one post disposed therebetween, each of the first and second support members plates configured for attachment to the rod transfer unit.

Broadly stated, in some embodiments, the passageway can comprise a first opening disposed through the first support member and a second opening disposed through the second support member.

Broadly stated, in some embodiments, the frame can further comprise an intermediate support member disposed between the first and second support members, the intermediate support member configured to support the at least one first roller.

Broadly stated, in some embodiments, the intermediate support member can be further configured to support the cutter.

Broadly stated, in some embodiments, the apparatus can further comprise at least one second roller disposed in the frame configured for contacting the coated rod when passing through the passageway, the at least one second roller configured to rotate about a second axis that is substantially orthogonal to the longitudinal axis and is oblique to the first axis.

Broadly stated, in some embodiments, the second axis can be substantially orthogonal to the first axis.

Broadly stated, in some embodiments, the apparatus can further comprise an adjuster configured for adjusting how much coating is stripped off of the coated rod when passing through the passageway.

Broadly stated, in some embodiments, the adjuster can comprise at least one adjusting rod configured for moving the cutter towards and away from the coated rod.

Broadly stated, in some embodiments, the cutter can be operatively coupled to a cutter support arm pivotally coupled to the frame.

Broadly stated, in some embodiments, the adjuster can comprise at least one adjusting rod configured for pivoting the cutter support arm towards and away from the coated rod.

Broadly stated, in some embodiments, the apparatus can further comprise a deflector disposed in the frame, the deflector configured for removing off a remainder of the coating from the coated rod after the strip of coating has been cut off of the coated rod.

Broadly stated, in some embodiments, the deflector can further comprise a groove configured for removing the remainder of the coating.

Broadly stated, in some embodiments, a method can be provided for stripping coating off of a coated rod, the method comprising the steps of: providing an apparatus for stripping coating off of a coated rod, the apparatus comprising: a frame configured for attachment to a rod transfer unit, the frame further comprising a passageway extending therethrough for receiving the coated rod, the passageway defining a longitudinal axis through the frame, at least one first roller disposed in the frame configured for contacting and guiding the coated rod in the apparatus when the coated rod passes through the passageway, the at least one first roller configured to rotate about a first axis that is substantially orthogonal to the longitudinal axis, and a cutter configured for cutting a strip of coating off of the coated rod when passing through the passageway; placing the coated rod in the passageway; placing the cutter in contact with the coated rod wherein the coated rod is in contact with the at least one first roller; and passing the coated rod through the passageway wherein the cutter means cuts a strip of the coating off of the coated rod thereby leaving a remainder of the coating on the coated rod.

Broadly stated, in some embodiments, the method can further comprise the step of removing the remainder of the coating off of the coated rod.

BRIEF DESCRIPTION OF THE DRAWINGS

FIG. 3 is a block diagram depicting a rod coating stripper being used in conjunction with a mobile rod transport and repair unit.

FIG. 4 is an elevation view depicting a mobile service well rig having a rod guide guiding rod between the mobile service well rig and a coiled rod reel.

FIG. 7A is front elevation view depicting the rod coating stripper of FIG. 5.

FIG. 7B is a right side elevation view depicting the rod coating stripper of FIG. 5.

FIG. 7C is a left side elevation view depicting the rod coating stripper of FIG. 5.

DETAILED DESCRIPTION OF EMBODIMENTS

Figure 1:
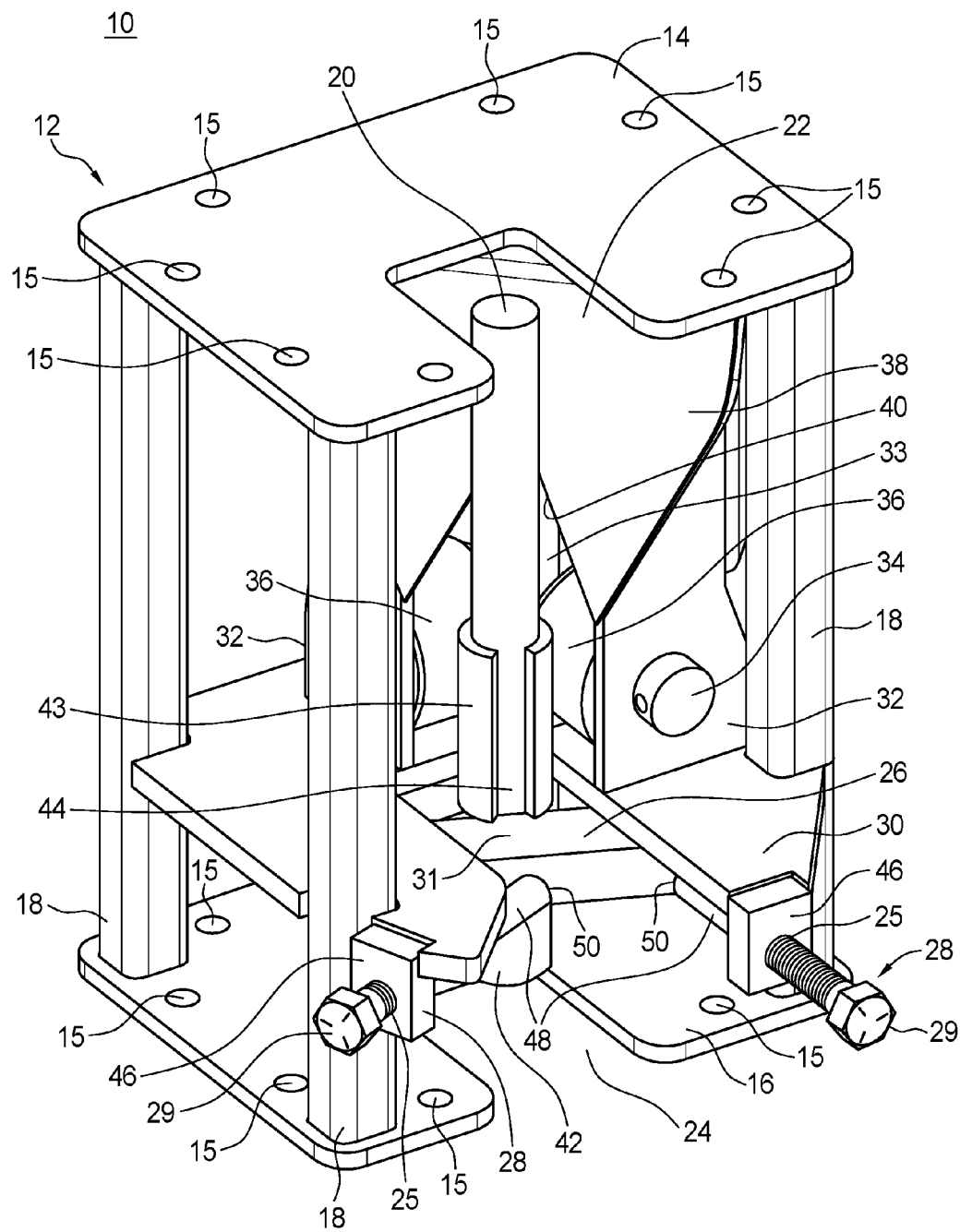
FIG. 1 is a top perspective view depicting one embodiment of a rod coating stripper.
Figure 2:
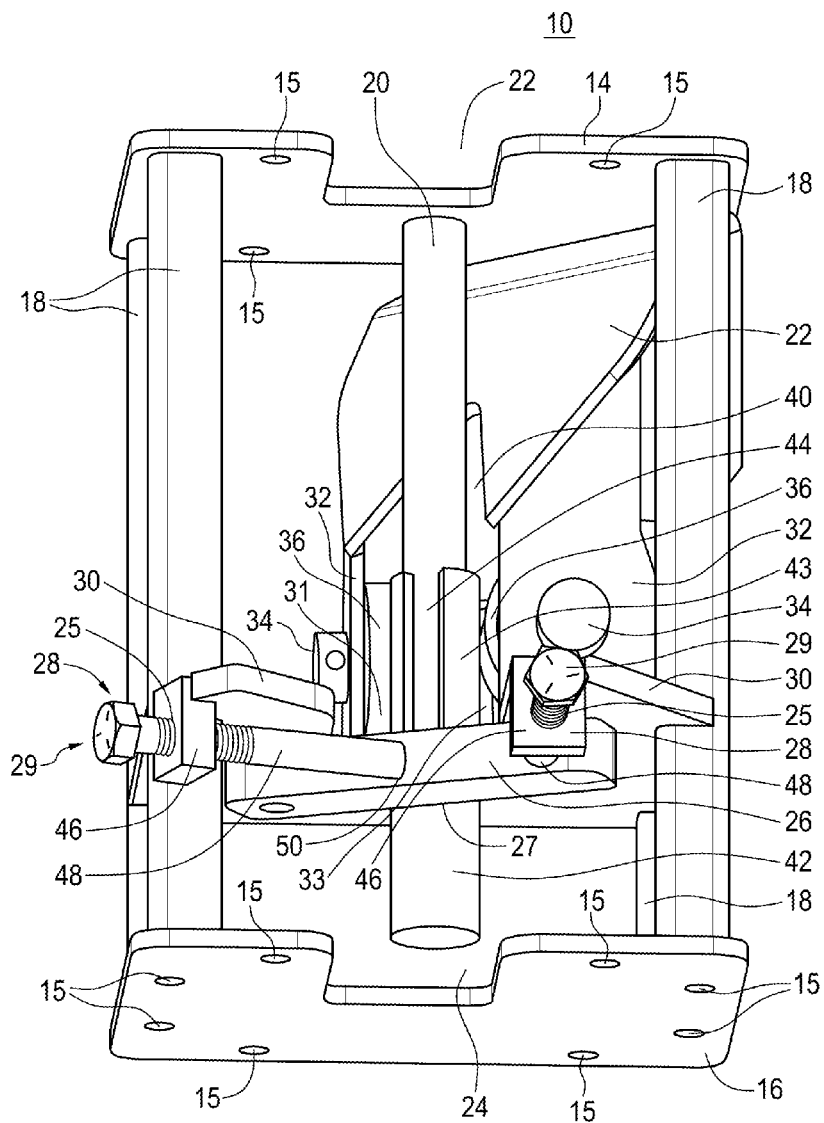
FIG. 2 is a bottom perspective view depicting the rod coating stripper of FIG. 1.

Referring to FIGS. 1 and 2, one embodiment of rod coating stripper 10 is shown. In some embodiments, stripper 10 can comprise frame 12 that can be further comprised of space-apart end plates (first and second support members) 14 and 16 with posts 18 disposed therebetween to provide a lattice or space-frame structure. In some embodiments end plate 14 can have passageway 22 disposed therethrough, and end plate 16 can have passageway 24 disposed therethrough to form a passageway and a longitudinal axis through stripper 10 to receive rod 20. Each of end plates 14 and 16 can further comprise a plurality of holes 15 disposed therethrough to enable attachment of stripper 10 to a rod transfer unit, as well known to those skilled in the art.

In some embodiments, stripper 10 can comprise intermediate support member or plate 30 disposed in frame 12 between end plates 14 and 16, that can further comprise passageway 31 that can be substantially aligned, longitudinally, with passageways 22 and 24. Plate 30 can further include one or more plate members 32, along with pillar 33, extending substantially perpendicularly from intermediate plate 30 towards end plate 14. In some embodiments, stripper 10 can comprise means for guiding coated rod 20 therethrough. In some embodiments, the guiding means can comprise at least one roller 36 rotatably disposed on pin 34 that can be disposed between plate member 32 and pillar 33, roller 36 configured to rotate about an axis that can be substantially orthogonal to the longitudinal axis of stripper 10. In some embodiments, stripper 10 can comprise two rollers 36 similar configured wherein a first roller 36 can rotate about a first axis that can be substantially orthogonal to the longitudinal axis of stripper 10, and wherein a second roller 36 can rotate about a second axis that be substantially orthogonal to the longitudinal axis of stripper 10, wherein the first and second axes are oblique to one another. In a further embodiment, the first and second axes can be substantially orthogonal.

In some embodiments, stripper 10 can comprise means for cutting strip 44 from coating 42 of coated rod 20. In some embodiments, the cutting means can comprise cutter bar 26 disposed in frame 12. In some embodiments, cutter bar 26 can comprise a rectangular bar further comprising cutting edge 27. Cutter bar 26 can be suspended in frame 12 and adjusted towards coated rod 20 by one or more adjusting rods 28. In some embodiments, rod adjuster 28 can comprise tab 46 extending substantially perpendicularly from intermediate plate 30 towards end plate 16, wherein tab 46 can comprise threaded hole 25 to receive threaded bolt 48 that can be seated in hole 50 disposed in cutter bar 26. By turning nut 29 disposed on bolt 48, cutter bar 26 can be advanced towards, or retracted from, coated rod 20 depending on the direction of rotation of nut 29 and whether hole 25 and bolt 48 have right-handed or left-handed threads, as well known to those skilled in the art. Thus, cutter bar 26 can be adjusted towards coated rod 20 so as to remove coating strip 44 therefrom and thereby leave remainder of coating 43.

In some embodiments, stripper 10 can further comprise means for removing remainder of coating 43. In some embodiments, the removing means can comprise deflector 38 disposed within frame 12 between end plate 14 and intermediate plate 30. In some embodiments, deflector 38 can comprise mouth or groove 40 that can be configured to peel or remove remainder of coating 43 from rod 20 as it passes through the passageway.

Referring to FIG. 3, an embodiment of a use of stripper 10 is shown. In this embodiment, stripper 10 can be attached to rod transfer unit 56 disposed on mobile transport and repair unit (or truck) 52 to remove coating off of coated rod 20 as it is wound onto continuous rod reel 54 by rod transfer unit 56 or, in other embodiments, when coated rod 20 is drawn off of continuous rod reel 54 by rod transfer unit 56.

Referring to FIG. 4, another embodiment of a use of stripper 10 is shown. In this embodiment, stripper 10 can be used to remove coating off of coated rod 20 as it is being withdrawn from well 66 by rod transfer unit 56 mounted on mast 60 of mobile service rig (or truck) 58, wherein stripped rod 20 can transit through rod guide 62 onto coiled rod reel 64. Alternatively, coated rod 20 can be stripped of coating by stripper 10 disposed on end 63 of rod guide 62 as rod is drawn from coiled rod reel 64 by rod transfer unit 56 disposed on mobile service rig 58 for insertion into well 66.

Referring to FIGS. 5 to 14, a second embodiment of rod coating stripper 10 is shown. In this embodiment, top plate 14 can be connected to bottom plate 16 via posts 18, which can further comprise tubular members. In this representative embodiment, three of posts 18 can be used between top and bottom plates 14 and 16. Mid plate 30 can be disposed therebetween and operatively coupled to posts 18 to provide structural support and strength to stripper 10. Disposed beneath mid plate 30 and operatively coupled to posts 18 can be support plate 74 operatively coupled to two of posts 18.

Figure 12:
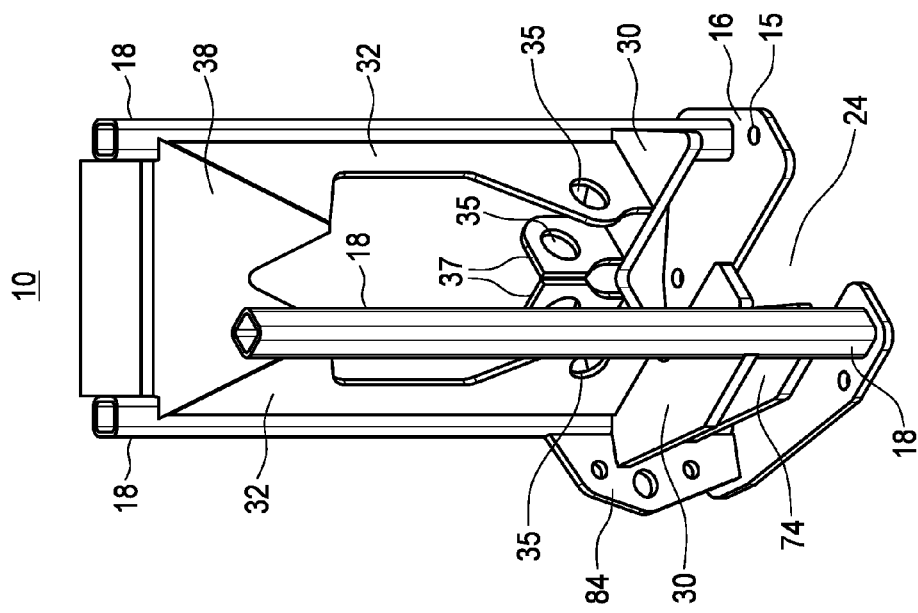
FIG. 12 is top perspective partial view depicting the rod coating stripper of FIG. 5 from the front.
Figure 11:
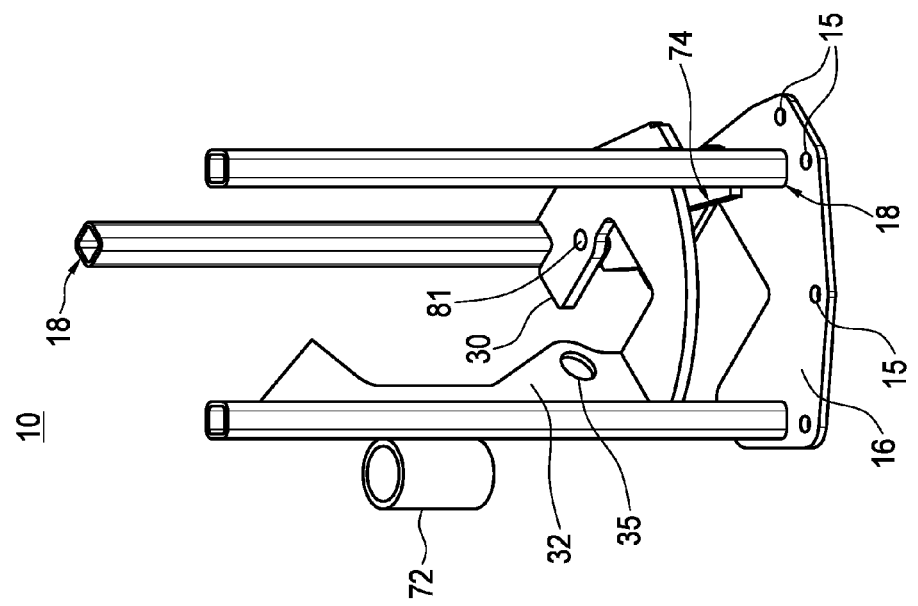
FIG. 11 is top perspective partial view depicting the rod coating stripper of FIG. 5 from the rear.
Figure 13:
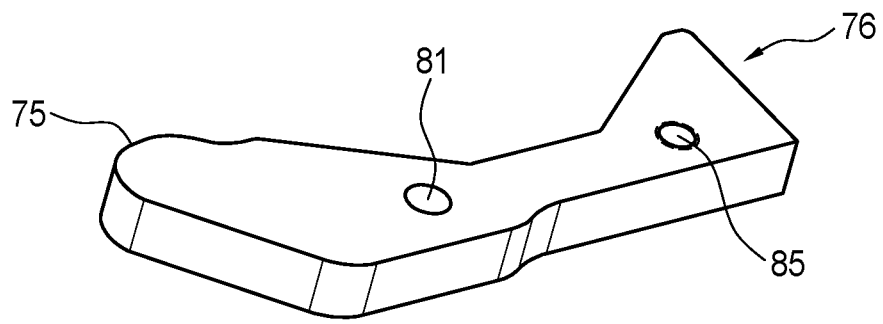
FIG. 13 is a top perspective view depicting the cutter support arm of the rod coating stripper of FIG. 5.

In some embodiments, vertical plates 32 can extend inward from two of posts 18 to provide support for deflector 38. Vertical plates 32 can further comprise apertures 35 configured to receive pins 34 that can further rotatably support rollers 36. Referring to FIG. 12, stripper 10 can further comprise support members 37, also comprising apertures 35, disposed on mid plate 30, for receiving pins 34 whereby rollers 36 can be rotatably disposed between vertical plates 32 and support members 37. In some embodiments, a pair of rollers 36 can be disposed on stripper 10 configured such that the pair of rollers 36 rotate about substantially orthogonal axes relative to one another. Rollers 36 can provide support to a coated rod (not shown) as it drawn past deflector 38.

Figure 5:
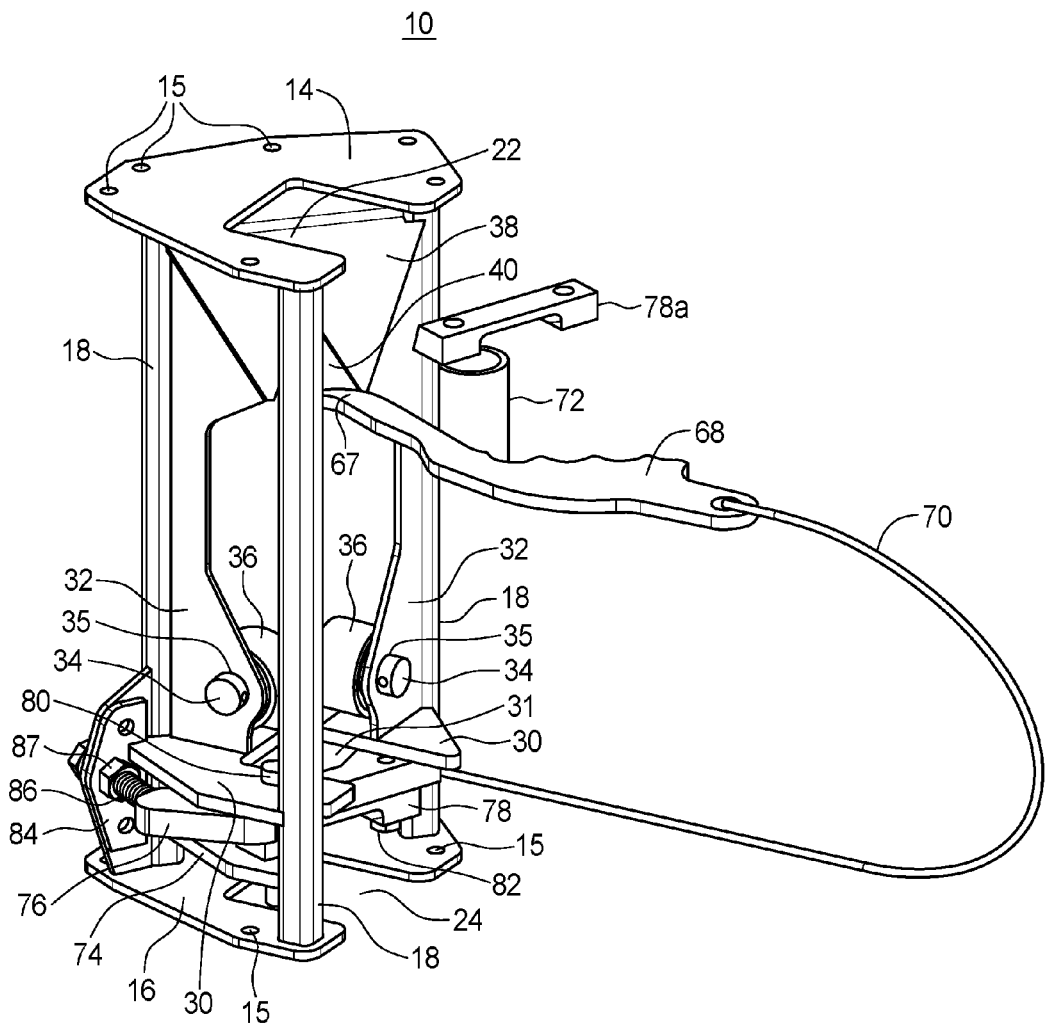
FIG. 5 is a top front perspective view depicting a second embodiment of a rod coating stripper.

In some embodiments, cutter support arm 76 and cutter blade 78 can be pivotally disposed between mid plate 30 and and support 74. Referring to FIGS. 7A to 14, one configuration of these elements are shown. In some embodiments, bolt 80 can pass through holes 81 disposed through mid plate 30, cutter support arm 76, cutter blade 78 and support plate 74 to be secured by nut 79. In so doing, cutter support arm 76 can then pivot about bolt 80. Cutter blade 78 can be further secured to cutter support arm 76 by bolt 82 passing through hole 83 disposed through cutter blade 78 to threadably engage threaded hole 85 disposed in cutter support arm 76. Referring to FIG. 5, spare cutter blade 78*a* is shown for illustrative purposes only.

In some embodiments, stripper 10 can comprise vertical plate 84 operatively attached to one of posts 18, wherein adjusting rod, or tension bolt, 86 can pass through vertical plate 84 and held in position by nuts 87 secured thereto. Tension bolt 86 can engage end 75 of cutter support arm 76 and, thus, cause cutter support arm 76 to pivot about bolt 80 when tension bolt 86 is rotated towards or away from end 75. This can allow cutter 78 to move inwards or outwards to accommodate varying diameters of coated rod to be stripped.

Figure 14:
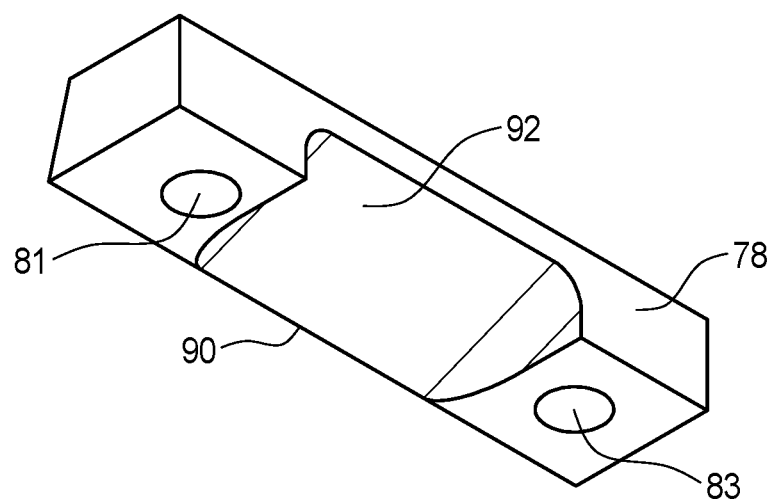
FIG. 14 a bottom perspective view depicting the cutter of the rod coating stripper of FIG. 5.

In some embodiments, referring to FIG. 14, cutter 78 can comprise a block of metal further comprising hollow 92 formed therein to further form cutting edge 90 along a portion of cutter 78. When cutter 78 is adjusted towards a coated rod by turning tension bolt 80, a strip of coating can be cut away from the coated rod by cutting edge 90, wherein the cut coating strip can be deflected away from the rod by hollow 92.

Figure 6:
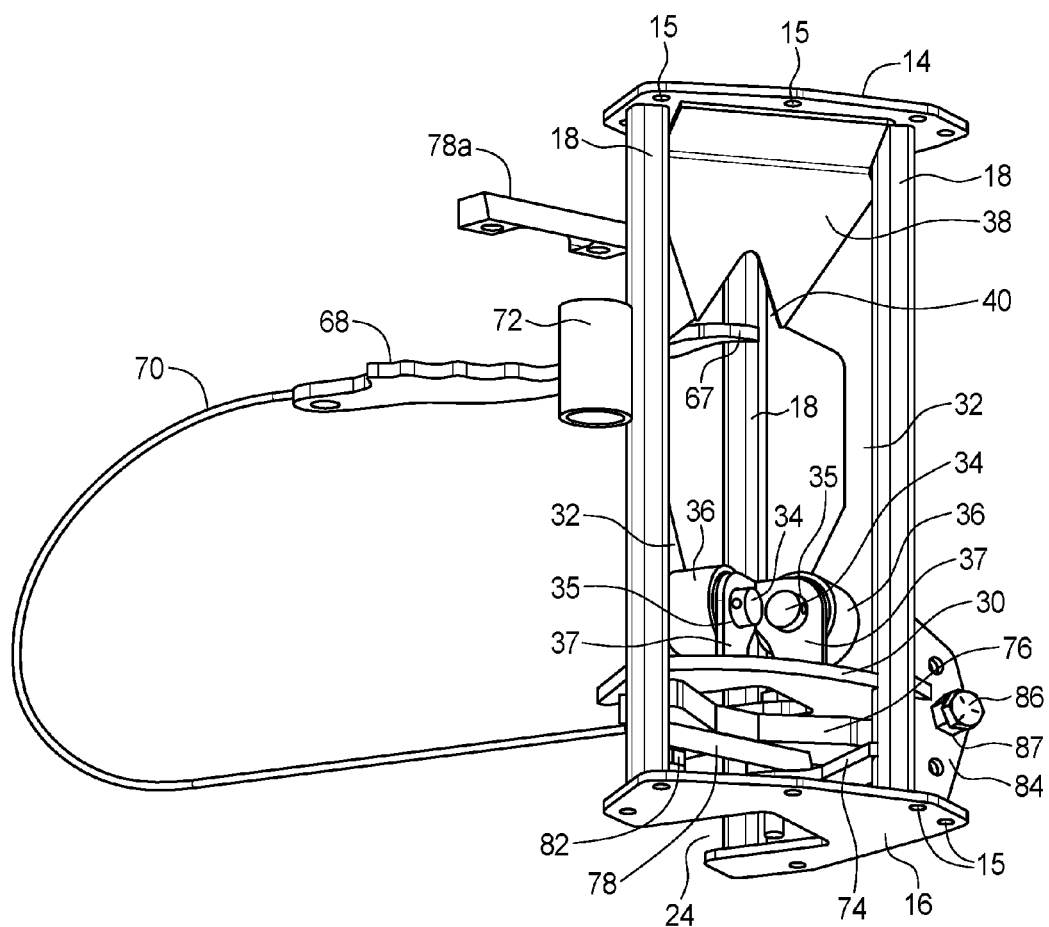
FIG. 6 is a bottom rear perspective view depicting the rod coating stripper of FIG. 5.
Figure 9:
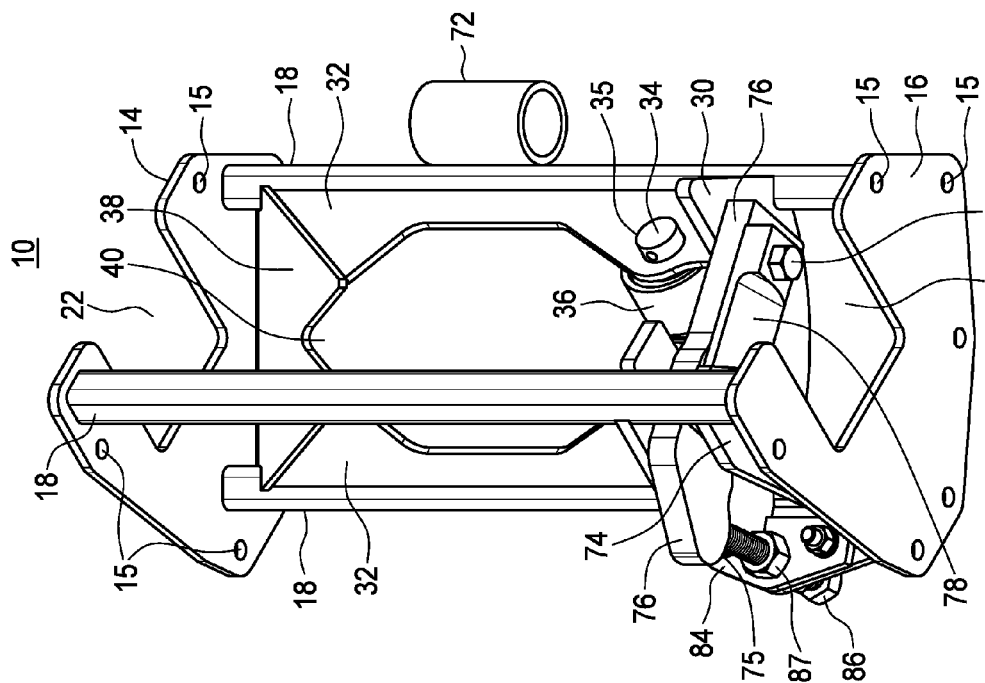
FIG. 9 is a bottom front perspective view depicting the rod coating stripper of FIG. 5.
Figure 8:
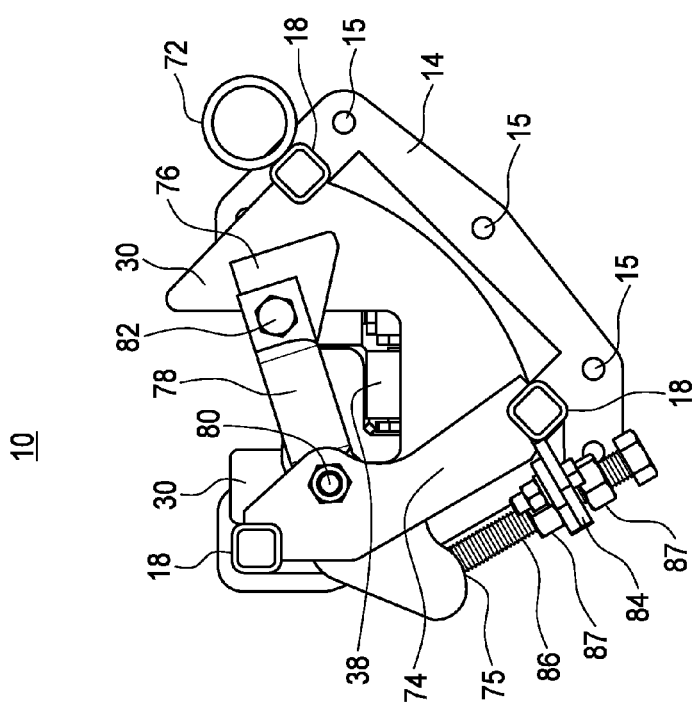
FIG. 8 is a bottom cross-section view depicting the rod coating stripper of FIG. 7A along section lines A-A.
Figure 10:
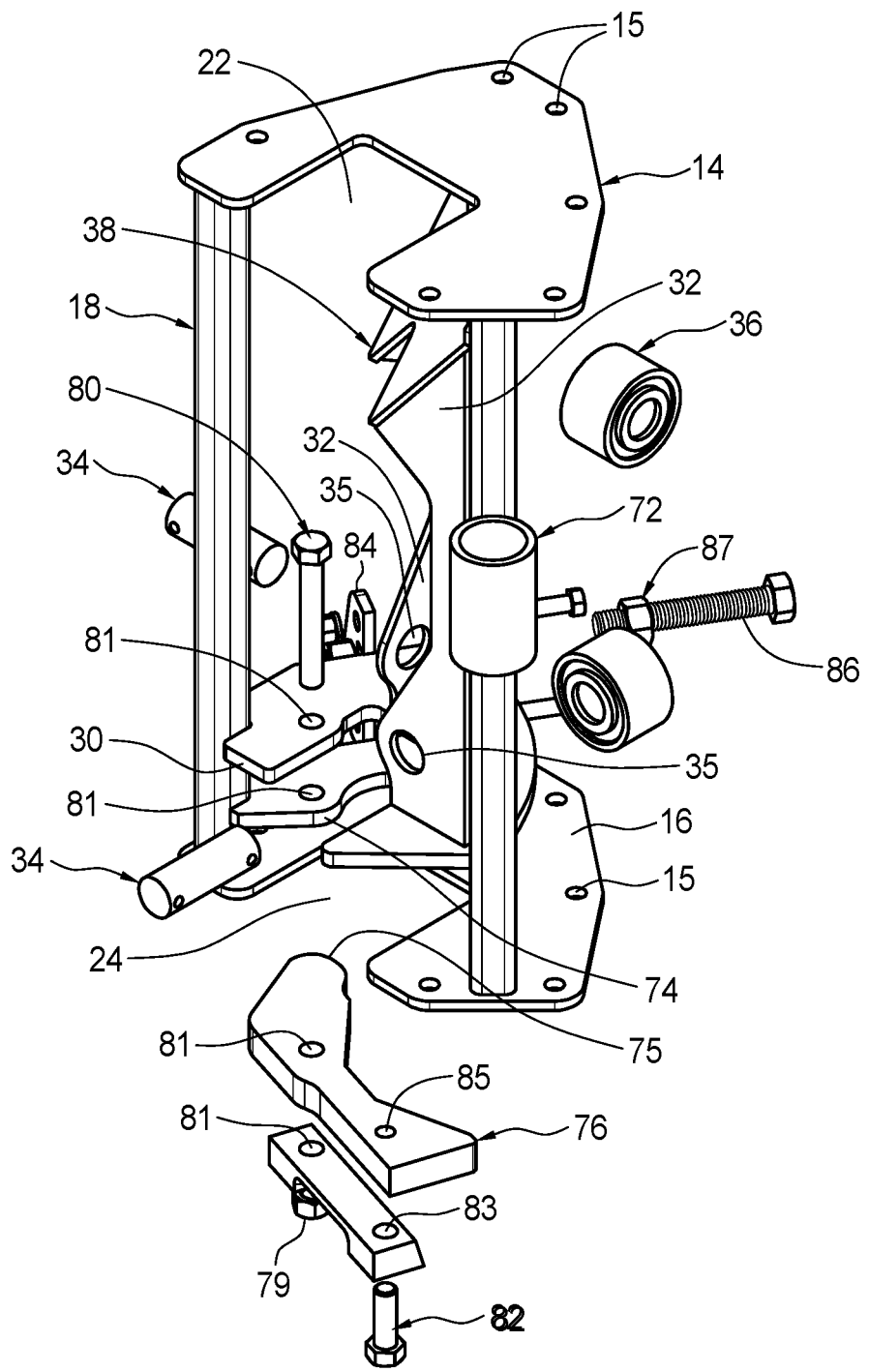
FIG. 10 is a left perspective exploded view depicting the rod coating stripper of FIG. 5.

In some embodiments, stripper 10 can further comprise pry tool 68 having tip 67, as shown in FIGS. 5 and 6. When cutter 78 begins cutting a strip of coating off of a coated rod, the remainder of the coating can be pushed away from the rod by pry tool 68 prior to the remainder of the coating engaging deflector 38 to be further deflected and removed from the rod. Pry tool 68 can be attached to stripper 10 with cable 70, and stored in tool holder 72, which can be a short length of tubing attached to one of posts 18, when not in use.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A method for stripping coating off of a coated rod, the method comprising the steps of:
    a) providing an apparatus for stripping coating off of a coated rod, the apparatus comprising:
        i) a frame configured for attachment to a rod transfer unit, the frame further comprising a passageway extending therethrough for receiving the coated rod, the passageway defining a longitudinal axis through the frame,
        ii) at least one first roller disposed in the frame configured for contacting and guiding the coated rod in the apparatus when the coated rod passes through the passageway, the at least one first roller configured to rotate about a first axis that is substantially orthogonal to the longitudinal axis,
        iii) a cutter configured for cutting a strip of coating off of the coated rod when passing through the passageway, and
        iv) at least one second roller disposed in the frame configured for contacting the coated rod when passing through the passageway, the at least one second roller configured to rotate about a second axis that is substantially orthogonal to the longitudinal axis and not parallel to the first axis;
    b) placing the coated rod in the passageway;
    c) placing the cutter in contact with the coated rod wherein the coated rod is in contact with the at least one first roller; and d) passing the coated rod through the passageway wherein the cutter means cuts a strip of the coating off of the coated rod thereby leaving a remainder of the coating on the coated rod.

2. The method as set forth in claim 1, further comprising the step of removing the remainder of the coating off of the coated rod.

3. The method as set forth in claim 1, wherein the frame comprises a first support member, a second support member and at least one post disposed therebetween, each of the first and second support members configured for attachment to the rod transfer unit.

4. The method as set forth in claim 3, wherein the passageway comprises a first opening disposed through the first support member and a second opening disposed through the second support member.

5. The method as set forth in claim 3, wherein the frame further comprises an intermediate support member disposed between the first and second support members, the intermediate support member configured to support the at least one first roller.

6. The method as set forth in claim 5, wherein the intermediate support member is further configured to support the cutting means.

7. The method as set forth in claim 1, wherein the second axis is substantially orthogonal to the first axis.

8. The method as set forth in claim 1, wherein the apparatus further comprises an adjuster configured for adjusting how much coating is stripped off of the coated rod when passing through the passageway.

9. The method as set forth in claim 8, wherein the adjuster comprises at least one adjusting rod configured for moving the cutter towards and away from the coated rod.

10. The method as set forth in claim 8, wherein the cutter is operatively coupled to a cutter support arm pivotally coupled to the frame.

11. The method as set forth in claim 10, wherein the apparatus further comprises at least one adjusting rod configured for pivoting the cutter support arm towards and away from the coated rod.

12. The method as set forth in claim 1, wherein the apparatus further comprises a deflector disposed in the frame, the deflector configured for removing the remainder of the coating.

13. The method as set forth in claim 12, wherein the deflector further comprises a groove configured for removing the remainder of the coating.

* * * * *